Patented Dec. 30, 1941

2,268,443

UNITED STATES PATENT OFFICE 2,268,443

SULPHONATION OF ORGANIC COMPOUNDS

John Alexander Crowder, Syracuse, N. Y., assignor to The Solvay Process Company, New York, N. Y., a corporation of New York No Drawing. Application December 27, 1939, Serial No. 311,122

19 Claims. (Cl. 260—686)

This invention relates to an improved process for sulphonation of organic compounds and a new sulphonating medium employed therein.

The use of strong sulphonating agents such as $SO_3$, oleum, and chorsulphonic acid has been proposed heretofore to carry out sulphonation of organic compounds. However, the direct sulphonation of organic substances with $SO_3$, oleum, chlorsulphonic acid, and other strong sulphonating agents in general results in the formation of dark-colored products due to carbonization and various side reactions and it has therefore been found necessary to submit the sulphonation products to clarification processes in order to obtain a product of desirable appearance. It has also been proposed to use an addition compound of sulphur trioxide and pyridine; e. g., N-pyridinium sulphonic acid, as a sulphonating agent. This agent, however, is a mild sulphonating agent and cannot ordinarily be used satisfactorily where a vigorous sulphonating agent is necessary.

It is an object of this invention to provide a new process of sulphonation with strong sulphonating agents, wherein charring and tar formation due to undesired side reactions are minimized.

It is a further object of this invention to provide a new sulphonating medium to accomplish such sulphonations.

I have discovered the sulphonation of organic compounds with strong sulphonating agents such as $SO_3$, oleum, and chlorsulphonic acid may be effected with little or no charring and tar formation due to undesired side reactions by carrying out the sulphonation in the presence of a small amount of an organic tertiary nitrogen base, i. e., less than 1 mol of the nitrogen base per mol active sulphonating agent. The sulphonation may be carried out in a solvent if desired, and the solvent and nitrogen base may be recovered and reused in subsequent sulphonations.

A sulphonating medium prepared in accordance with my invention comprises a vigorous sulphonating agent such as $SO_3$, oleum or chlorsulphonic acid, wherein free (or loosely combined) $SO_3$ or $ClHSO_3$ is the active sulphonating agent, and a nitrogen base. As above indicated, the amount of nitrogen base present in the sulphonation reaction mixture should be less than 1 mol per mol active sulphonating agent. In the case of oleum, the free $SO_3$, i. e., the $SO_3$ in excess of 100% $H_2SO_4$ is considered the active sulphonating agent, while in the case of $SO_3$ and chlorsulphonic acid, these substances themselves are the active agents.

A solvent such as liquid $SO_2$, $CCl_4$, or mixed fluoride and chloride of carbon (e. g., $CCl_2F_2$) may also be present to promote intimate mixing of the reactants or to dilute the reaction mixture and moderate the effect of the sulphonating agent. It may be advantageous to use the organic substance to be sulphonated as the solvent, when it is a liquid. For example, the nitrogen base may be mixed with the substance to be sulphonated and the sulphonating agent then added thereto. A solution of $SO_3$ in liquid $SO_2$, with the organic tertiary nitrogen base added, is the preferred sulphonating medium of my invention.

The organic tertiary nitrogen bases suitable for the sulphonating medium of my invention include pyridine and its homologs, the quinolines, tertiary amines such as triethylamine, and other similar tertiary nitrogen bases. Pyridine, quinoline, and isoquinoline, especially pyridine, have been found particularly advantageous. The nitrogen base does not enter into the reaction and may be recovered and reused in subsequent sulphonations. The mechanism of its tempering action on strong sulphonating agents is not fully understood, but may be considered catalytic since in some cases I have found as little as $\frac{1}{100}$ mol of the nitrogen base per mol $SO_3$ is sufficient to show substantial reduction of undesired side reactions and to yield an improved sulphonation product. Moreover, where the addition of a small amount of nitrogen base results in substantial reduction of side reactions and improvement in color the addition of a further quantity of the nitrogen base has not been found to result in substantially greater improvement.

The above-described sulphonating medium, comprising a strong sulphonating agent with a small amount of nitrogen base added, is generally operative for sulphonation of organic substances to produce sulphonic acids or sulphuric acid esters. Its use is particularly advantageous for sulphonations requiring vigorous sulphonating conditions, i. e., for compounds difficult to sulphonate, where the use of a vigorous sulphonating agent has been found to bring about side reactions leading to undesired charring or tar formation; for example, in the sulphonation of fatty acids, fatty acid anhydrides, fatty acid amides, and ketones. As indicated above, the addition of the nitrogen base surprisingly eliminates or reduces the side reactions and results in a substantially lighter-colored, purer reaction product than is obtained without the added nitrogen base.

The sulphonating medium of my invention is advantageous as compared to sulphonating media where $SO_3$ is bound in the form of an addition compound, for example, a medium containing N-pyridinium sulphonic acid as the sulphonating agent, in that the sulphonating medium of my invention has a more vigorous action and difficult sulphonations may be effected at room temperature. For example, ketones and fatty acids which cannot be sulphonated at temperatures below 50° C. by a solution of N-pyridinium sulphonic acid in $SO_2$ were readily sulphonated at temperatures of 20 to 30° C. by a solution of $SO_3$ in $SO_2$ containing pyridine in amount less than one mol per mol $SO_3$.

In accordance with the preferred method of carrying out my invention, a sulphonating medium may be prepared by dissolving $SO_3$ and pyridine in liquid $SO_2$. For example, $SO_3$ may be distilled from oleum containing 20% $SO_3$ and the distilled $SO_3$ dissolved in liquid $SO_2$ which may advantageously be that recovered from the sulphonation reaction mixture as described below. The nitrogen base may then be added to the $SO_3$—$SO_2$ solution, the number of mols of nitrogen base always being less than the mols $SO_3$, and preferably less than one mol per mol of $SO_3$ to be introduced into the organic substance to be sulphonated. The substance to be sulphonated may advantageously be dissolved or suspended in a further quantity of liquid sulphur dioxide and the sulphonating mixture added thereto with vigorous stirring. The reaction mixture is maintained at the desired temperature, which in many cases, for example, the sulphonation of ketones, fatty acids, and amides, may be room temperature. The pressure is preferably maintained at about the vapor pressure of the reaction mixture at the existing temperature. When sulphonation is substantially complete, substantially all the sulphur dioxide is distilled from the reaction mixture, condensed, and reused in succeeding sulphonation batches if a batch process is used, or reintroduced for dissolution of the sulphonating agent if a continuous process is used. Small amounts of unused $SO_3$ and nitrogen base may distil over with the $SO_2$; these are retained in the condensed $SO_2$ and reused in succeeding sulphonations. The residue from the distillation, comprising the sulphonated organic substance, the nitrogen base, unused $SO_3$ and some residual $SO_2$, is preferably dissolved in water and heated or blown with air or steam to remove the residual $SO_2$. The solution from which the sulphur dioxide has been removed is then neutralized with alkali, e. g., soda ash. The nitrogen base may be recovered from the resulting solution by evaporation, whereby it distils off together with water. After concentration, the nitrogen base may be dehydrated, for example, by distillation with calcium oxide, the nitrogen base thereby being recovered for future use in the process. The solution containing the sulphonated organic substance may be evaporated and dried whereby there is obtained a sulphonated product of attractive appearance, free from substantial amounts of tar or carbonized products and requiring no further clarification treatment.

The solution of $SO_3$ in $SO_2$ may also be prepared by partially oxidizing $SO_2$ to $SO_3$ and thereafter condensing the gaseous mixture, or by passing gaseous $SO_2$ through oleum to strip $SO_3$ therefrom and condensing the gaseous mixture of $SO_2$ and $SO_3$ thereby obtained.

Among the fatty acids which may advantageously be sulphonated in accordance with my invention, saturated higher fatty acids which contain from 8 to 24 carbon atoms and especially those containing 14 to 18 carbon atoms are of particular importance. Among such acids may be mentioned the following: myristic acid, palmitic acid, stearic acid, arachidic acid, behenic acid, and lignoceric acid. Mixtures of fatty acids, particularly those derived from the hydrolysis of naturally occurring fats and oils, may also be used with advantage. As examples of fats and oils from which the mixture of fatty acids may be derived there may be mentioned tallow, babassu oil, palm oil, cocoanut oil, and fish oils, e. g., menhaden fish oil. These materials contain glycerides of saturated and unsaturated higher fatty acids. Tallow, for example, is composed of glycerides of the saturated fatty acids stearic acid, palmitic acid and myristic acid and the glycerides of the unsaturated fatty acids oleic and linoleic acids. If desired, these oils may be hydrogenated before hydrolysis to obtain the fatty acid mixture.

In sulphonating the above-described fatty acids in accordance with the preferred method of practicing my invention, i. e., using a sulphonating medium comprising $SO_3$ and pyridine dissolved in liquid $SO_2$, the amount of $SO_3$ may vary from about 1 to 10 mols per mol fatty acid and is preferably in the range of about 2 to 5; the $SO_2$ may vary from about 10 to 300 mols per mol fatty acid and is preferably in the range of about 50 to 150; the pyridine may vary from about .02 to 1.2 mols per mol fatty acid and is preferably within the range of about .1 to .15.

Among the fatty acid amides I have found advantageous to sulphonate in accordance with my invention the amides of the fatty acids listed above, including mixtures of amides obtained by amidation of the above-described mixed fatty acids derived from naturally occurring fats and oils, are of particular importance. In sulphonating fatty acid amides in accordance with the preferred method of practicing my invention, i. e., using a sulphonating medium comprising $SO_3$ and pyridine dissolved in liquid $SO_2$, the $SO_3$ may vary from about 1 to 10 mols per mol amide and is preferably in the range of about 2 to 6; the $SO_2$ may vary from about 10 to 300 mols per mol amide and is preferably in the range of about 50 to 150; the pyridine may vary from about .02 to 1.2 mols per mol amide and is preferably in the range of about .5 to .7.

Among the ketones which may advantageously be sulphonated in accordance with my invention the ketones prepared by catalytic pyrolysis of the fatty acids listed above are of particular value. When a fatty acid mixture (such as that obtained by hydrogenation and hydrolysis of naturally occurring fats and oils) is used for the preparation of ketones a complex mixture of ketones is obtained. For example, when the fatty acids of cocoanut oil, composed chiefly of saturated fatty acids containing from 8 to 18 carbon atoms, primarily lauric acid, $C_{11}H_{23}COOH$, are converted to ketones the mixture may comprise ketones containing from 15 to 35 carbon atoms, the average ketone in the mixture containing about 23 carbon atoms. In sulphonating ketones in accordance with the preferred method of practicing my invention, i. e., using a solution of $SO_3$ and pyridine dissolved in liquid sulphur dioxide, the amount of $SO_3$ may vary from about 2 to 10 mols per mol ketone and is preferably in the range of about 4 to 6; the $SO_2$ may vary from about 10 to 500 mols per mol ketone and is preferably in the range of about 150 to 300; the pyridine may vary from about .1 to 2 mols per mol ketone and is preferably in the range of about 1 to 1.5.

Examples illustrative of the invention are given below. In all of the examples, $SO_3$ was used as the sulphonating agent and liquid sulphur dioxide was used as solvent for the reaction mixture. All quantities are stated on the basis of 1 mol of organic substances.

*Example 1.*—A mixture of cocoanut oil ketones, purified by crystallization, was sulphonated in a reaction mixture containing 6 mols $SO_3$, 1.2 mols pyridine, and 225 mols $SO_2$ per mol of ketones. The mixture was allowed to react 6 hours at 20 to 30° C. under the pressure autogenously developed. At the end of the reaction the sulphur dioxide, pyridine, and reaction products were separated as above described. A yield of 95.3% sulphonation product was obtained and the product was very light in color, while the product obtained by sulphonating a similar material under the stated conditions with the same quantities of materials, but without pyridine, was found to be considerably darker.

*Example 2.*—A mixture of cocoanut oil ketones, purified by crystallization, was sulphonated in a reaction mixture containing 6 mols $SO_3$, .63 mol pyridine, and 112 mols $SO_2$ per mol of organic substance. The process was carried out under the conditions described in Example 1. A yield of 96.6% sulphonation product was obtained, the product having a lighter color than that obtained by sulphonation under the same conditions but without pyridine.

*Example 3.*—Stearic acid was sulphonated in a reaction mixture containing 3 mols $SO_3$, .11 mol pyridine, and 112 mols sulphur dioxide per mol of stearic acid at room temperature (20 to 30° C.) and autogenous pressure. After 6 hours, sulphur dioxide and pyridine were removed from the reaction mixture and the sulphonated product recovered. A yield of 97.5% sulphonated stearic acid was obtained and the product was much improved in appearance over that obtained under similar conditions but without the use of pyridine.

*Example 4.*—Stearic acid was sulphonated in a reaction mixture containing 3 mols $SO_3$, .026 mol pyridine, and 112 mols $SO_2$ per mol stearic acid under conditions similar to those outlined in Example 3. The sulphonation product thereby obtained (96% yield) was much improved in appearance over the product made under similar conditions but without pyridine.

*Example 5.*—Stearic acid was sulphonated in a reaction mixture containing 3 mols $SO_3$, .73 mol triethylamine, and 112 mols $SO_2$ per mol organic substance in a process such as that described in Example 3. The sulphonation product obtained in a yield of 94.8% showed an improvement in color over that obtained without the use of the nitrogen base.

*Example 6.*—Stearic acid was sulphonated in a reaction mixture containing 3 mols $SO_3$, .125 mol quinoline, and 112 mols sulphur dioxide per mol stearic acid in a process such as that outlined in Example 3. The sulphonated stearic acid product showed an improvement in color over that obtained without the use of a nitrogen base.

*Example 7.*—Stearic acid was sulphonated in a reaction mixture containing 3 mols $SO_3$, .128 mol isoquinoline, and 112 mols $SO_2$ per mol stearic acid. The sulphonated product obtained in a yield of 97.2% had an improved appearance over that obtained without the use of a nitrogen base.

*Example 8.*—Stearamide was sulphonated in a reaction mixture containing 3 mols $SO_3$, .63 mol pyridine, and 112 mols $SO_2$ per mol stearamide at a temperature of 20 to 30° C. and autogenous pressure. After 6 hours, sulphur dioxide and pyridine were removed from the reaction mixture and the sulphonated product recovered. The sulphonation product resulting therefrom showed an improved appearance over the product obtained without the use of a nitrogen base.

*Example 9.*—Myristamide was sulphonated in a reaction mixture containing 4.6 mols $SO_3$, .63 mol pyridine, and 112 mols $SO_2$ per mol myristamide under the conditions of Example 8. The resulting sulphonation product was of very good appearance as compared to the darker product obtained when no nitrogen base was used.

Where the term "sulphonate" (or modification thereof) is used in the specification and claims it is intended to have its usual general meaning, i. e., to refer to a reaction where sulphonic acids, sulphuric acid esters or mixtures thereof may be the reaction products.

The term "vigorous sulphonating medium" as used in the claims is intended to refer to a medium which contains a substantial amount of a strong sulphonating agent such as $SO_3$, oleum or chlor-sulphonic acid in excess of that which may possibly combine with nitrogen base present; i. e. a medium which contains a sufficient excess of the active sulphonating agent to give the medium a vigorous sulphonating action as compared to the relatively mild sulphonating action of a nitrogen base sulphate such as N-pyridinium sulphonic acid. The term "vigorous sulphonating conditions" as used in the claims is intended to refer to the sulphonating conditions existing in a vigorous sulphonating medium as above described. The term "medium" as used herein refers to the components of the sulphonation reaction mixture other than the material being sulphonated. The medium thus may include the sulphonating agent, the nitrogen base and the solvent if one is added.

Since changes may be made in the process above described without departing from the scope of my invention, it is intended that the description shall be interpreted as illustrative and not in a limiting sense.

What is claimed is:

1. The improvement in processes for sulphonation of organic compounds with a strong sulphonating agent, which comprises carrying out the sulphonation in the presence of an organic tertiary nitrogen base in amount substantially less than one mol base per mol active sulphonating agent.

2. A process for sulphonating an organic compound which comprises treating the organic compound with a vigorous sulphonating medium comprising a substance from the group $SO_3$, oleum and chlorsulphonic acid and which contains an organic tertiary nitrogen base in amount substantially less than one mol of said base per mol active sulphonating agent.

3. A process for sulphonating an organic compound which comprises treating the organic compound with a vigorous sulphonating medium comprising a substance from the group $SO_3$, oleum and chlorsulphonic acid and which contains an organic tertiary nitrogen base selected from the group pyridine, quinoline, and isoquinoline in amount substantially less than one mol of said base per mol free $SO_3$ or $ClHSO_3$.

4. The improvement in processes for sulphonation of organic compounds wherein $SO_3$ is the active sulphonating agent, which comprises carrying out the sulphonation under vigorous sulphonating conditions in the presence of pyridine in amount substantially less than one mol pyridine per mol $SO_3$.

5. A process for sulphonating an organic compound which comprises treating the organic compound with $SO_3$ and an organic tertiary nitrogen base in amount less than one-quarter mol of said base per mol $SO_3$.

6. The improvement in processes for sulphonation of organic compounds by means of $SO_3$ which comprises carrying out the sulphonation under vigorous sulphonating conditions in the presence of pyridine in amount substantially less than one mol pyridine per mol $SO_3$.

7. The improvement in processes for sulphonation of organic compounds difficult to sulphonate, wherein $SO_3$ is the active sulphonating agent, which comprises carrying out the sulphonation under vigorous sulphonating conditions in the presence of an organic tertiary nitrogen base in amount substantially less than one mol of said base per mol $SO_3$, and less than one mol of said base per mol of $SO_3$ to be introduced into the organic substance to be sulphonated.

8. A process for sulphonating a compound from the group fatty acids, fatty acid amides and aliphatic ketones which comprises treating the compound with a vigorous sulphonating medium in which $SO_3$ is the active agent and which contains an organic tertiary nitrogen base in amount substantially less than one mol of said base per mol $SO_3$.

9. A process for sulphonating an organic compound difficult to sulphonate which comprises treating the organic compound with a vigorous sulphonating medium comprising $SO_3$ dissolved in liquid sulphur dioxide, in the presence of an organic tertiary nitrogen base in amount substantially less than one mol of said base per mol $SO_3$.

10. The improvement in processes for sulphonating, by means of $SO_3$ dissolved in liquid sulphur dioxide, a compound from the group fatty acids and fatty acid amides containing 8 to 24 carbon atoms and ketones derivable from such fatty acids by pyrolysis, which comprises carrying out the sulphonation under vigorous sulphonating conditions in the presence of an organic tertiary nitrogen base in amount substantially less than one mol of said base per mol $SO_3$.

11. A process for sulphonating a fatty acid containing from 14 to 18 carbon atoms which comprises treating the fatty acid with about 2 to 5 mols $SO_3$ dissolved in about 50 to 150 mols liquid sulphur dioxide per mol fatty acid, in the presence of about 0.1 to 0.15 mol pyridine, and recovering said pyridine from the reaction product.

12. A process for sulphonating a fatty acid amide containing from 14 to 18 carbon atoms which comprises treating the fatty acid amide with about 2 to 6 mols $SO_3$ dissolved in about 50 to 150 mols liquid sulphur dioxide per mol amide, in the presence of about 0.5 to 0.7 mol pyridine, and recovering said pyridine from the reaction product.

13. A process for sulphonating a ketone derivable by pyrolysis from fatty acids containing 8 to 18 carbon atoms which comprises treating the ketone with about 4 to 6 mols $SO_3$ dissolved in about 150 to 300 mols liquid sulphur dioxide per mol ketone, in the presence of about 1.0 to 1.5 mols pyridine, and recovering said pyridine from the reaction product.

14. A vigorous sulphonating medium for organic compounds which comprises a vigorous sulphonating agent and an organic tertiary nitrogen base which may be recovered substantially unchanged from a sulphonation reaction in which the sulphonating medium is employed, present in amount substantially less than one mol of said base per mol active sulphonating agent.

15. A sulphonating medium for organic compounds which comprises a substance from the group $SO_3$, oleum and chlorsulphonic acid, and an organic tertiary nitrogen base which may be recovered substantially unchanged from a sulphonation reaction in which the sulphonating medium is employed, present in amount less than one-quarter mol of said base per mol $SO_3$ or $ClHSO_3$.

16. A vigorous sulphonating medium for organic compounds which comprises $SO_3$ and an organic tertiary nitrogen base which may be recovered substantially unchanged from a sulphonation reaction in which the sulphonating medium is employed, present in amount substantially less than one mol of said base per mol $SO_3$.

17. A vigorous sulphonating medium for organic compounds which comprises a solution in liquid sulphur dioxide of $SO_3$ and pyridine in amount substantially less than one mol of pyridine per mol $SO_3$.

18. A process for sulphonating an organic compound which comprises treating the organic compound with a strong sulphonating agent and an organic tertiary nitrogen base in amount substantially less than one mol of base per mol of active sulphonating agent in the presence of a solvent for the sulphonating agent.

19. A vigorous sulphonating medium for organic compounds which comprises a substance from the group $SO_3$, oleum and chlorsulphonic acid, and organic tertiary nitrogen base which may be recovered substantially unchanged from a sulphonation reaction in which the sulphonating medium is employed, present in amount substantially less than one mol of said base per mol active sulphonating agent, and a solvent selected from the group liquid $SO_2$, $CCl_4$, and $CCl_2F_2$.

JOHN ALEXANDER CROWDER.